Jan. 5, 1926.

E. E. CLEMENT

1,568,939

SYSTEM FOR RADIO BROADCAST DISTRIBUTION

Original Filed August 14, 1922   6 Sheets-Sheet 1

Jan. 5, 1926.  
E. E. CLEMENT  
1,568,939  
SYSTEM FOR RADIO BROADCAST DISTRIBUTION  
Original Filed August 14, 1922   6 Sheets-Sheet 2

Jan. 5, 1926.

E. E. CLEMENT 1,568,939

SYSTEM FOR RADIO BROADCAST DISTRIBUTION

Original Filed August 14, 1922   6 Sheets-Sheet 4

Jan. 5, 1926.

E. E. CLEMENT

1,568,939

SYSTEM FOR RADIO BROADCAST DISTRIBUTION

Original Filed August 14, 1922      6 Sheets-Sheet 5

Inventor

Edward E. Clement

Patented Jan. 5. 1926.

1,568,939

UNITED STATES PATENT OFFICE.

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA.

SYSTEM FOR RADIO BROADCAST DISTRIBUTION.

Continuation of application Serial No. 581,829, filed August 14, 1922. Patent No. 1,522,357, dated January 6, 1925. This application filed December 12, 1924. Serial No. 755,574.

*To all whom it may concern:*

Be it known that I, EDWARD E. CLEMENT, a citizen of the United States, residing at Washington, in the District of Columbia, have invented certain new and useful Improvements in Systems for Radio Broadcast Distribution, of which the following is a specification, reference being had therein to the accompanying drawings.

My invention relates to systems and methods of broadcast distribution. The present application is a continuation of my copending application, Serial No. 581,829, filed August 14, 1922, issued as Patent No. 1,522,357, dated January 6, 1925, and is intended to cover certain phases of apparatus disclosed but not claimed in said application.

The invention has for its objects, among others the following: To organize radio broadcasting service on a commercial basis, and to control the service units or receiving stations so that the various contingencies incidental to commercial operation may be efficiently met, such as maintenance, supervision, and the imposition and collection of charges; to localize each unit of a system, so that it may be tested and supervised; to standardize the distributed unit agencies in a system, while enabling them to receive messages broadcasted on various wave lengths; to control radio broadcasting so that it may supplement in organized service existing telephone exchange systems in such manner that the Government, in time of public need, may take over such radio broadcasting systems on an organized basis, and operate or supervise the same, without disturbance of the telephone service.

Incidental objects are to enable transition from wired to so-called wireless methods of communication to be accomplished without substantial changes in practice, or injury to investment; and to ensure the proper and natural organization of radio systems when such transition occurs.

The foregoing objects are attained by providing a system having for its basis the distribution among regular subscribers in localized areas, of standardized receiving instruments, each local area taking its broadcasting service from its own central station on such wave length as may be fixed and determined for that area. Each receiving station is connected to the local central station by a wire circuit, through which both distribution and the control of the local station are attained. Without being subject to the limitations of an all-wire telephone system, this arrangement enables me conveniently to feed the substations with current from central for divers purposes, to control the receiving instruments at said stations from the central station, and to meter the radio service rendered for the purpose of making charges. Other benefits flowing from this arrangement will sufficiently appear from the detailed description hereinafter.

The use of individual wire circuits as described, renders it possible to locate each unit and by special means which will be described, to test and supervise said unit at the substation, as well as to disconnect and disable the same in case of necessity.

My invention is illustrated in the accompanying drawings, in which:

Fig. 3ª is a fragmentary view showing switchhook controlled contacts for removing the ground from battery A, during broadcast reception.

Figure 1:
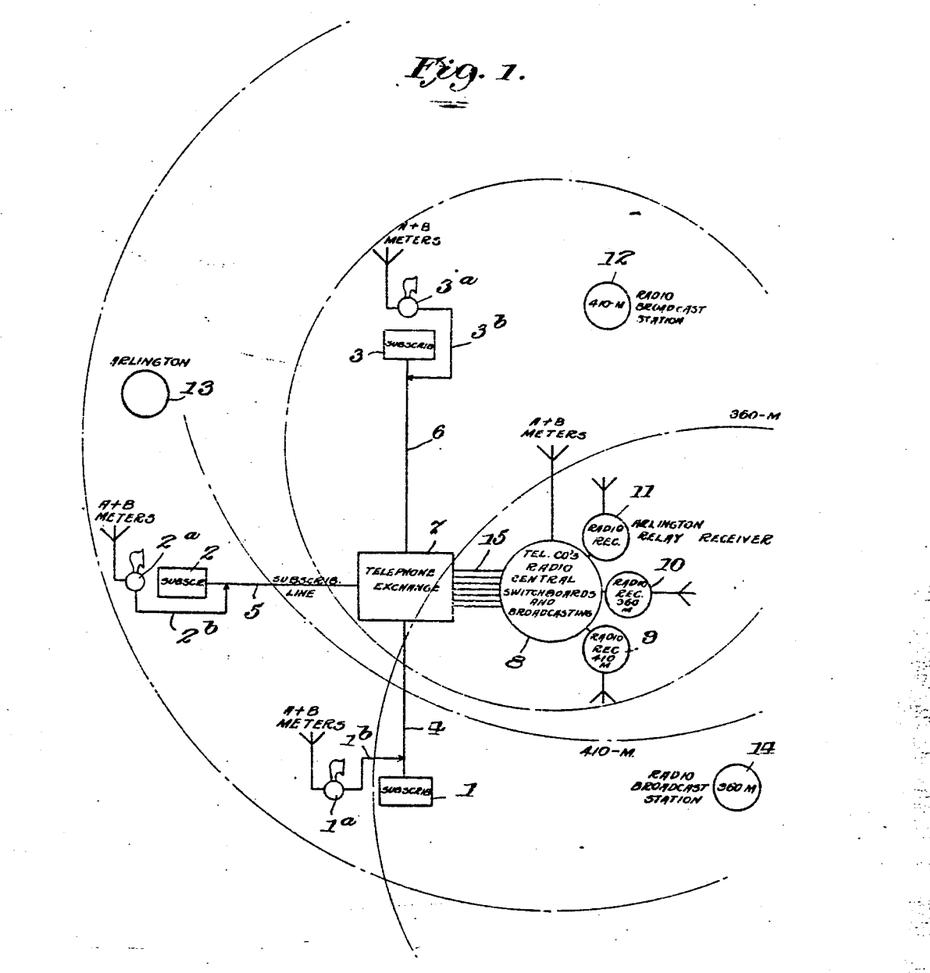
Fig. 1 is a diagram showing a general system embodying the same.

Referring to Fig. 1, 1, 2 and 3 represent telephone subscribers' stations connected by wires 4, 5 and 6 to the central telephone exchange 7, constituting the distributing center for the area in which local subscribers 1, 2, 3, etc., are located. Superposed upon this telephone system is a radiophone system comprising a central station 8 and subscribers' stations 1ª, 2ª, 3ª, etc. The central radio station or exchange is provided with switchboards and a complete broadcasting equipment, and the subscribers' stations 1ª, 2ª, 3ª, etc., are provided with receiving instruments all standardized for the same wave length, and adapted to respond to the waves radiated from the central station 8. The interrelation between the telephone system and the radiophone system is by means of physical connections indicated at 1ᵇ, 2ᵇ, and 3ᵇ at the subscribers' stations, and multiples or trunk extensions 15 from the telephone exchange switchboards to the radiophone exchange switchboard station No. 8. The detail of these connections will appear hereinafter, but it should be stated here that the system of connections is such that telephone wired traffic has the right of way over the wires, while the radio traffic has the right of way over the radio side of the system. The arrangement is such that the radio operator cannot interfere with telephone operation, nor can a telephone operator interfere with the radio operation, although under proper conditions each can act freely by way of borrowing facilities from the other. At all times, should a question of precedence arise, the apparatus is arranged so as automatically to cut off the radio connections and to leave the wired lines clear for telephonic use.

Stations 12, 13 and 14 in this figure are typical of indifferently located distant stations which may or may not be a part of this particular system. As the figure is typical only, no attempt has been made to give the geographical location of such stations or to show the actual arrangement and distribution of the telephone centers through which final broadcasting to the subscribers must take place. The main purpose of this figure is to crystallize the method employed, by which the development of a very large number of unrelated individual receiving stations is replaced by an orderly system of distribution through the telephone centers, whereby the individual receiving instruments are localized, maintained, controlled, and supplied with definite service through regular channels, for which a definite charge can be made and collected in the manner usual in wired systems of communication. Inasmuch as the number of wave lengths available for transmission is limited in the present state of the art, advantage is taken of the organized system of wire distribution and localization to create a phantom system controlled and guided thereby.

Briefly stated, as indicated in Fig. 1, each radio central station or radio department of a telephone exchange, is not only provided with broadcasting equipment for its subscribers, but also with radio receivers adjustable by tuning to wave lengths allotted to such stations as those indicated at 12, 13 and 14, as well as primary stations maintained and operated by or under the direction of the telephone organization itself. By means understood in the art, messages received at the radio central stations are relayed on their respective standard wave lengths to the local subscribers.

Figure 2:
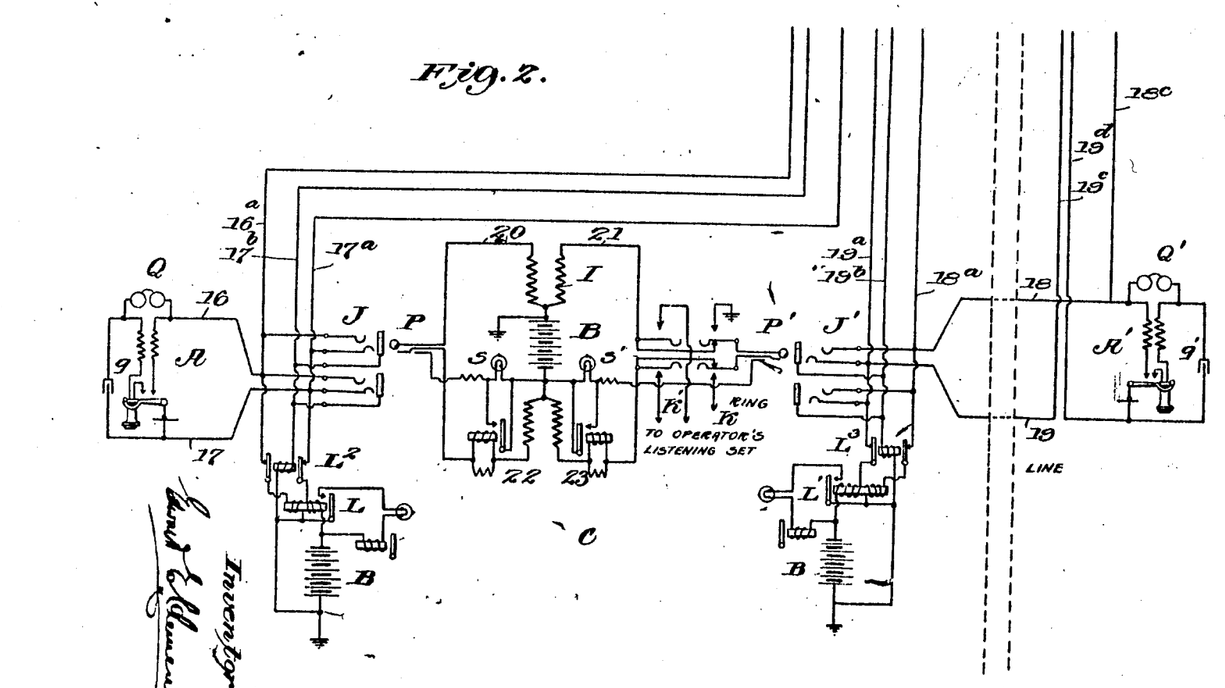
Fig. 2 is a diagram showing a central station telephone switchboard, subscribers' lines terminating thereon, and subscribers' telephones connected thereto.
Figure 3:
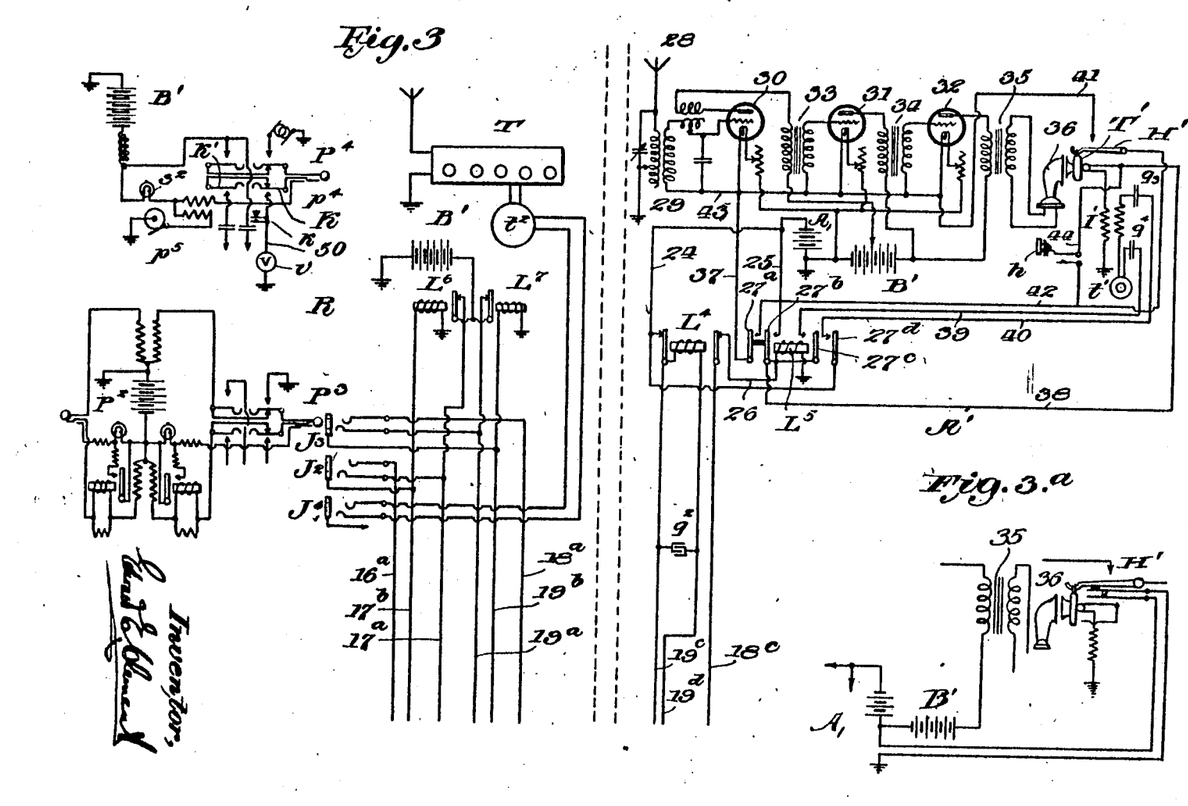
Fig. 3 is a diagram to be read in connection with Fig. 2, showing the radiophone set at one of the subscriber's stations, and the radio switchboard and associated equipment at the central station.

Referring to Figs. 2 and 3, I have therein shown circuits of the central office and substation equipments and connections, Fig. 2 representing the telephone side of the system, and Fig. 3 the radiophone side of the system. Before proceeding to detail description it may be noted that in accordance with standard telephone practice, provision is made for keeping the telephone lines and central office circuits clear of all grounds or other disturbing connections during conversation. When the radiophone goes into service, by closing the filament switch its operation in receiving is identical with that of any radio receiver, and in the event that use is made of any partial transmission of waves over the line wires, as will be hereinafter pointed out, said waves will be at a frequency above or below the limits of audition. In the present diagram, Figs. 2 to 9 inclusive, I have shown the circuits arranged with nothing but continuous current for radio purposes over the telephone line wires. This is the simplest form of control and the one nearest to present-day telephone practice, and is absolutely certain not to produce any disturbance in adjacent conductors in the telephone cables. Each radiophone set is provided with a cut off relay energized when the telephone set goes into commission, either by calling or being called, and at the central office whenever the radio operator takes control of the line, he disables it in the usual manner by pulling up the cut off relay at the telephone switchboard, this however being subject to the condition that a special tone test may be put on, so that all operators may know that the line is held on the radio board, and subject to interruption for telephone connection. I prefer to use this tone test only with the radio operator's testing plug, because his regular connecting plug includes within its functions that of connecting a subscriber through the station amplifier to the broadcasting transmitting set, and a connection of this character should not be interrupted without permission.

Referring now to the diagrams, Fig. 2, A and A' are two subscribers' stations connected by line wires 16—17 and 18—19 respectively to the central station C where they terminate on jacks J and J'. P—P' are plugs forming the terminals of a cord circuit 20—21, 22—23, having a bridged repeating coil I, ringing and listening keys K and K', supervisory signals s—s' and bridging connection to the main battery B. The same battery is shown supplying current to the line relays L, L', and through contacts at the cut off relays $L^2$, $L^3$ to the respective lines for calling purposes. In this system, when a subscriber takes down his receiver, the line relay lights its lamp, which is extinguished when the operator inserts the answering plug. Battery supply for the connected lines is thereafter taken through the cord circuit 20—22, 21—23, in a manner well understood in the art. When the substation telephones are out of service, with their receivers hanging on their hooks, the line circuits are conductively open for direct current, leaving the ringers Q and Q' in circuit for alternating ringing current passing through the condensers q—q'.

Referring now to Fig. 3, it will be observed that the radio switchboard which I have designated generally by the letter R, is connected to the subscribers' lines by multiple taps marked $16^a$, $17^a$, and $17^b$, and $18^a$, $19^a$, $19^b$. These terminate on multiple jacks $J^2$, $J^3$, corresponding to the multiple jacks on the telephone switchboard. It should be noted that throughout this system the tip wires 16 and 18 with their branches are connected to ground, while the sleeve wires 17 and 19 and their branches, are connected to battery. This is extended into the radio side of the system for the purpose of securing proper balance between the main battery or power plant of that side and the main battery or power plant of the telephone side of the system.

At the subscribers' stations taps are also taken off from the telephone terminals to the radiophone terminals as indicated at $18^c$, $19^c$, and $19^d$. (The radiophone is shown only at one substation for sake of simplicity of illustration). The two branches $19^c$ and $19^d$ are taken from the sleeve or battery side of the line 19, and are connected to opposite terminals of the winding of a relay $L^4$, which constitutes the substation cut off relay for the radiophone. The winding of this relay is bridged by a condenser $q^2$ through which both ringing and voice currents can pass without substantial impedance. Where the radiophone is attached to a party line substation, this relay $L^4$ may be omitted, since on such party lines there are usually grounds on one side or the other. As will presently appear, the radio circuits described herein are applicable to two-party or four-party lines, with individual metering of the party stations.

Normally, that is to say when the telephone circuit is not in use, the cut off relay $L^4$ is deenergized and as a consequence the wire $19^c$ is connected through a back contact of the relay through extension wire 24 to the branch 25 connected to the "A" battery marked $A_1$ in Fig. 3. The wire $18^c$ similarly passes through a back contact of the relay to the extension wire 26 leading to test or listening relay 27 and ground. $18^c$, it will be remembered, leads to the tip or ground side of the line, therefore it is the side which in the radiophone can be made use of with a permanent ground or grounds, without disturbing the balance of the telephone circuit.

The radiophone receiver at the substation A' is shown as comprising an antenna 28, tuned coupler 29, detector tube 30, audio amplifier tubes 31 and 32, and the usual transformers, 33, 34, 35, the last mentioned transmitting the amplified audio waves to the telephone receiver or loud speaker 36. The filament battery is $A_1$. The plate battery is $B_1$ and suitable tuning condensers and coils, tickler coil for regenerative effects, etc., are provided as required. I should remark in passing that this representation of the radio receiver is intended to be typical only. The present invention does not concern itself specifically with the design of the local radiophone sets, and other circuits and apparatus may be substituted for those shown in the diagrams without departure from the invention.

The relay $L^5$ has four pairs of contacts, one pair $27^a$ closing the wires 25 and 37 from battery $A_1$ to the filaments. The second pair $27^b$ closes the wires 25 and 38 so as to put battery $A_1$ on the radiophone transmitter T', and through the induction coil I', to ground. The third and fourth pairs of contacts $27^c$, $27^d$, close the wires 39 and 40, forming terminals of the secondary induction coil circuit I', to the tip and sleeve side of the telephone line respectively, through the back contacts of relay $L^4$. The transmitter T' is shown hanging upon a hook switch H' controlling the connection of wires 41 and 42, constituting a parallel link between the battery $A_1$ and the filament bus 43. Thus the filament can be heated and the radiophone put in service either through the agency of the relay $L^5$, or by the switch hook H'. The former is controlled by the radio operator at central, and the latter by the subscriber at the substation. In addition to the hook, the subscriber has a manual switch h by which he can connect the battery wire 42 through a wire 44 to his transmitter T', coil and ground, so as to energize his talking circuit. I provide an ordinary telephone receiver t' in series with the secondary of the induction coil I', and I interpose a pair of condensers $q^3$, $q^4$ between the secondary of the induction coil I', and the receiver t' on the one hand, and the terminals of relay L⁵ on the other, so that while the subscriber by means of switch h can connect his phone T'—t' for receiving calls over the telephone line, he cannot originate calls thereover from the radiophone extension.

Returning now to the central station, and particularly to the radio department thereof shown in Fig. 3, T represents a broadcasting transmitter, symbolized in very simple form, but supposed to contain the usual elements of power supply, modulator, oscillator and aerial, with suitable amplification of the audio waves supplied on the input side. The jack J⁴ connected to the amplifier t² and thence to the transmitter T, symbolizes a group of such jacks or equivalent connecting means such as automatic switches, controlled by dials or keys for connecting any of the wire lines to said radio transmitter. Detailed appliances, both for the switching and for the radio transmission, are well known in the art, and need no specific description in this specification, my present invention having to do particularly with the method of transmitting by wave radiation to the substations, and of bringing in all conversation originating or received at the substation radiophone over the subscriber's wire line. This includes repetition of modulated radio waves received at the radiophone substation and also originating messages gathered up and to be put through the amplifier t² on the transmitter T for broadcasting.

It may be explained here that the transmitter T for general purposes is assumed to be the standard wave length transmitter for the local exchange area, to which all of the substations are tuned and upon which they depend both for original messages and programs and for those received and relayed from a distance. There are special cases, however, in which certain groups of radiophone subscribers may desire intercommunication among themselves, and I contemplate therefore the installation of duplicates of this transmitter, which may be connected up for such group use. For example, a chess club desiring to meet, arranges a program, and at the appointed time its members attend at their radiophones, all removing their transmitters T' from their hooks, while the radio operator at the central station plugs up the multiples of their respective lines through their jacks J²—J³, and connects them on to a special broadcasting transmitter of the type T. This plugging up may be carried out in any desired manner, there being several ways well known in the art for thus connecting telephone lines together. The radio operator then supervises the operation, since any one of the connected subscribers may be speaking through the broadcasting transmitter to the others, and it is necessary to prevent interruption. The same might be said of any meeting of a group of people held in this manner, the most valuable feature of this part of the invention being the absolute control afforded over the transmitted messages. The connection to the broadcasting transmitter is solely within the control of the radio operator at the jack J⁴ or any other suitable form of switch, and he has it in his power therefore to cut off connection at any time.

Figure 4:
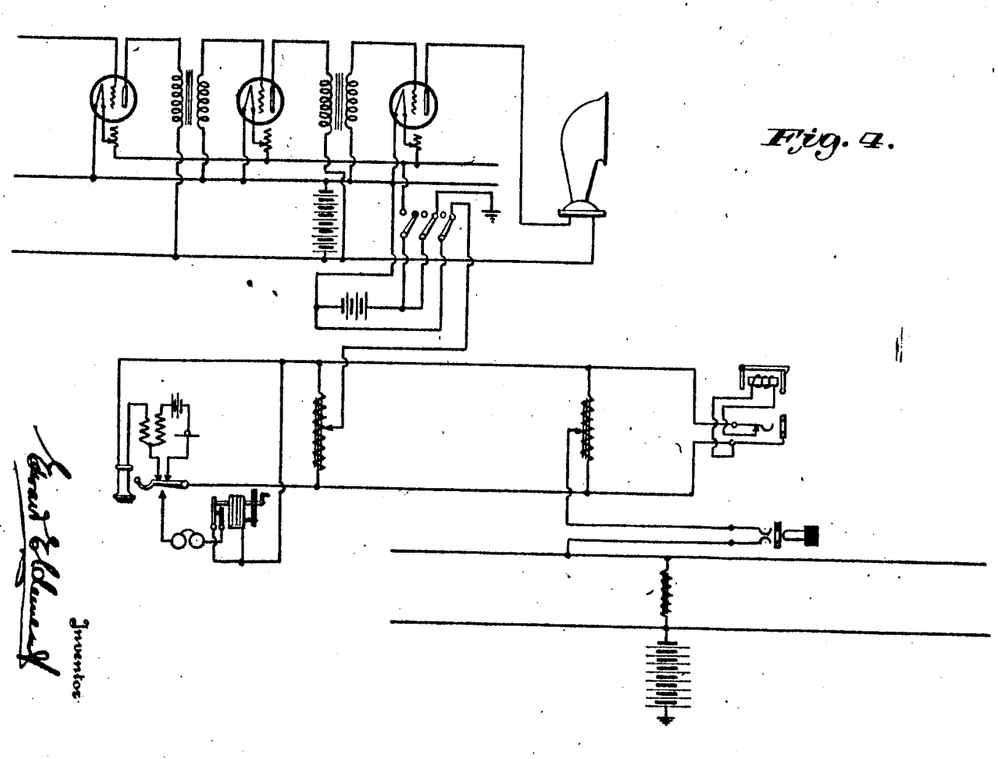
Fig. 4 is a diagram showing a substation battery charged and controlled over a phantom circuit imposed on a metallic magneto telephone circuit.

The cord circuit between plugs P² and P³ in Fig. 3 is the same as the operator's cord circuit in Fig. 2, but the radio operator also has special test cords such as that shown in the upper part of the figure connected to plug P⁴. Here the keys K—K' are of standard construction, as in the other cords, and the test contact of the plug P⁴ is connected through suitable resistance to the supervisory lamp $s^2$ to the radio battery B', means such as the commutator $p^5$ being provided to give special tone test on the test thimbles of the multiple jacks J, J', J², etc. It will be observed that the constant connection of the sleeve or battery wire 24 at the radiophone substation to the bus wire 25 of the battery $A_1$, produces charging of that battery by the constant flow of current therethrough from the main radio battery B' at the central office. The amount of energy thus delivered to the battery $A_1$ depends upon the size of the line wires, and the length of time available for such charging. As shown, the battery wire 24 is not cut off except when the cut off relay L⁴ pulls up which is only when the line wire is in use for conversation. With No. 19 line wires, and using only the sleeve wire for conduction, it would be possible to safely transmit from one-half ampere to two or three amperes, according to the line resistance and the voltage of the battery employed. Where this voltage is standard manual telephone voltage, say 22, and the single wire resistance to the substation is from 25 to 50 ohms, it would be possible to maintain the battery $A_1$ continuously charged, provided the time of discharge be not too long extended, and the charging be not interrupted by other contingencies, such as the excessive telephone use of the line. In Fig. 4 of the drawing, I show means for charging such a battery over a phantom circuit composed of the two sides of a magneto, telephone line. Such a phantom circuit of course possesses still lower resistance than a single wire of the pair and correspondingly augments the amount of energy that may be delivered without a prohibitive loss. I wish to point out in connection with this, that radio instruments have recently been devised by the commercial radio corporations, and also by the United States Bureau of Standards, which employ rectified alternating current for lighting the filaments of the audion tubes, such currents being stepped down to the usual voltage of the filaments from the voltage of house mains or feeder lines. Using such a type of transformer and rectifier circuit, it is within the scope of my invention, to feed the filaments direct, and at the same time charge a floating storage battery $A_1$ if desired, by transmitting over my line wire 19—19ᵃ—24 a sine wave current at such voltage as will deliver the necessary energy.

Connected to the key K is a wire 50 containing a supplemental key $k$ to connect the voltmeter or other suitable indicating instrument V and ground. The key K' serves to connect the operator's listening set, and also to put batter on the tip of the plug, by which means current is thrown out on the tip side 18 of the line, then through extension 18ᶜ and back contact of relay $L^4$ to the winding of relay $L^5$ and ground. The operation of these test keys will be obvious from the description. Key $k$ enables the operator to take a reading on the battery $A_1$, the line resistance being known, and the main batteries B, B' being disconnected both at the cut off relays $L^3$, $L^7$ from the line itself and by the back contacts of key K from the plug $P^4$. This is the most important test because the lamp filaments can be observed by the subscriber, and any defect therein reported over the telephone. A companion test however enables the operator to determine whether the radiophone instrument as a whole is functioning properly, assuming the transmitter T' to be hung upon its hook H' and as shown to have its mouth piece turned toward the emission orifice or diaphragm of the radio telephone receiver. Connection of battery B' to the relay $L^5$ causes the subscriber's telephone set T', I', to be connected to line and so to the multiple jack $J^3$, plug $P^4$ and the operator's head phone connected through the listening key K'. It is assumed of course that some form of broadcasting is going on from the transmitter T, so that the radio operator not only gets a test on the performance of the individual subscriber's radiophone, but also gets a test on his own broadcasting transmitter and on the relative tuning of the same with respect to the subscriber's station.

It should be noted that battery B' in Fig. 3 is connected to the sleeve wires 17a, 19a through the contacts of cut off relays $L^6$ $L^7$, energized in parallel with the line cut off relays $L^2$ and $L^3$, either from the radio board or from the telephone switchboard. This enables the central office under all circumstances to keep a talking line balanced and supplied with current only through the connective cord or switch circuit, but as shown in Figs. 5 to 8 inclusive, the connections of the radio battery and that of the main battery are such that the balance is normally maintained, and current is supplied in such a way to the sleeve side of the line that no signaling apparatus on the telephone switchboard is affected thereby.

Figure 5:
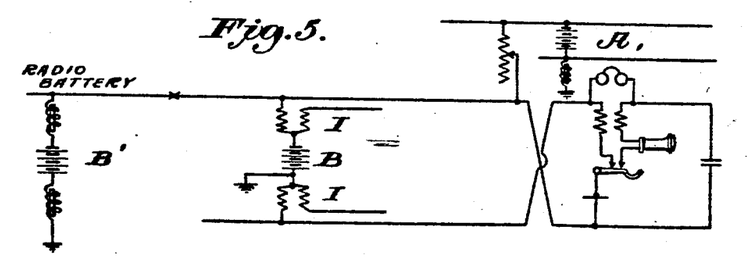
Figs. 5, 6, 7 and 8 are schematic circuits showing methods of connecting the radio battery with relation to the centralized telephone battery.

Fig. 5 shows the condition when a subscriber is talking through the telephone switchboard, the repeating coil I and the main battery B being shown as bridged across the line, and the radio battery B' permanently connected through the sleeve side to the subscriber's battery $A_1$. Battery supply for both the subscriber's transmitter and the battery $A_1$ would as a matter of fact be drawn in due proportion from each of the centralized batteries B, B', and the resultant effect would be to divide the load between the two parallel sources, without changing the normal condition.

Figure 6:
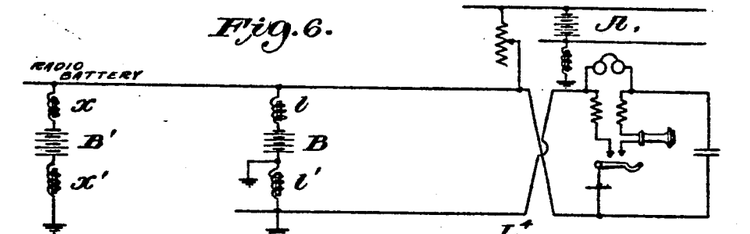

Fig. 6 shows the same arrangement when the subscriber's telephone station is idle, and the main battery B is bridged across the line wires between the two windings $l$—$l'$ of the subscriber's line relay on the telephone switchboard; while the radio battery is connected in parallel to the sleeve side of the line through low resistance choke coils $x$—$x'$ which do not appreciably reduce the potential placed upon the line terminal of the winding $l$ of the line relay, which being exposed to balanced potentials, will not be energized unless the subscriber calls.

Figure 7:
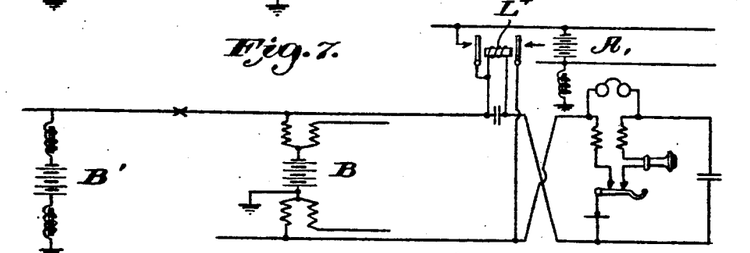
Figure 8:
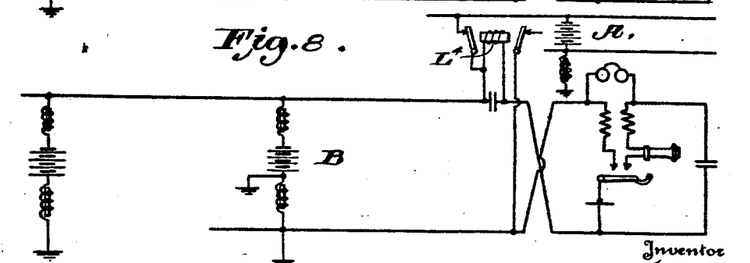

Figs. 7 and 8 show corresponding conditions with the cut off relay $L^4$ at the subscriber's station for detaching the battery $A_1$ when the subscriber is talking.

It is not considered necessary to actually adopt a permanent connection of the radio battery B' because telephone conversations are usually brief and the time of use of the current flow in the sleeve wire would not be thereby greatly curtailed. At the same time I have provided means in the cut off relays $L^6$, $L^7$ to disconnect the battery B' when the lines are plugged up for conversation as at $x$ in Figs. 5 and 7, and when such cut off relays are employed, the choke coils $x$—$x'$ may be omitted, so that a practically perfect balance may be had across the terminals of the line relay $l$. In other words, by using the cut-off relays $L^6$, $L^7$, of Fig. 3, I am able to dispense with choke coils $x$—$x'$ and connect the battery or charging generator of any type as shown in Fig. 3.

Figure 9:
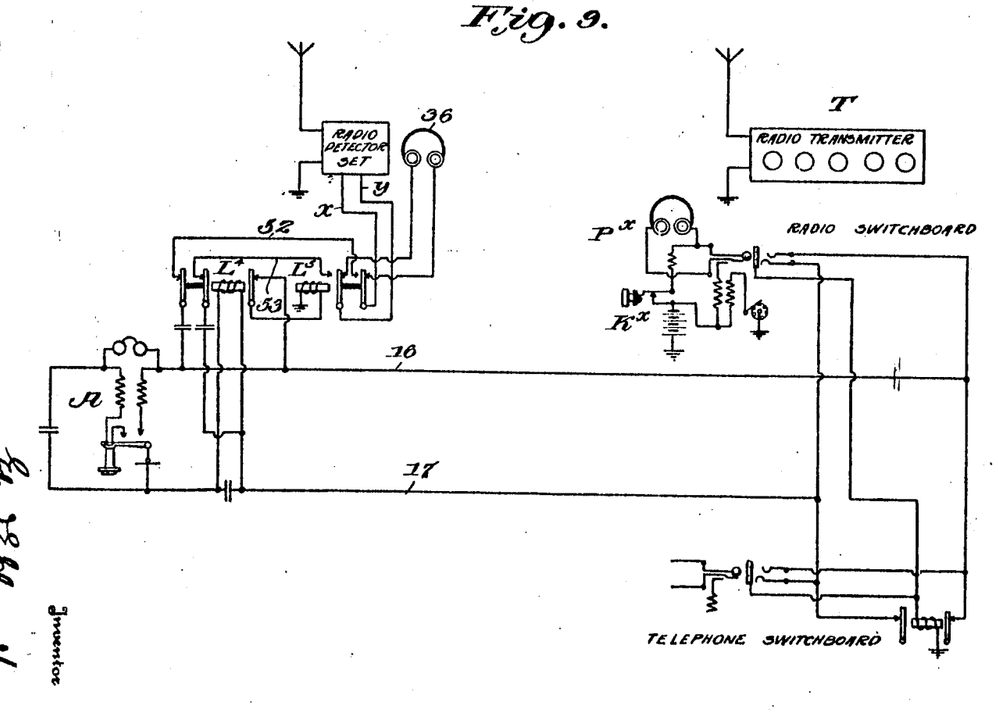
Fig. 9 is a diagram of a modified arrangement of circuits.

Fig. 9 shows a modified circuit in which the telephone switchboard and radio switchboard are provided with multiple line connections as before, the radio switchboard having connections to the radio broadcasting transmitter T and the radio operator having a full equipment of cords and plugs of known types symbolized at P$x$. The substation is provided with a radio detector set and receiver 36, normally connected to the radio detector set through back contacts of the relay L⁵, which when energized by means of the operator's key kx at the radio board, will disconnect the receiver 36 and connect the radio detector set on its audio side directly to wires 52—53 and so through the contacts of cut off relay L⁴ to the line wires 16—17. As there is no battery shown for the detector set (which is typical only), the radio central battery feed is omitted in this figure, which represents a very simple standardized system in which however the radio operator still has perfect control for all purposes of the substation radiophone. It should be noted that the continued energization of relay L⁵ disables the radio set, and by winding this relay so as to consume little current, this affords means to disconnect the subscriber's circuit from the radio switchboard until an inspector can make his rounds and the instrument can be removed.

If it be desired to have no grounds on the radio battery busses at substations, such as that on the A battery at station A', in Fig. 3, the ground wires may be carried through contacts on switch hook H', opened when the hooks are up. Many other details of operation may be introduced and changes made, without departing from the scope of my invention.

I claim:

1. A broadcast distributing system comprising a plurality of substations, a central station, a wire line connecting each substation with the central station, a radio broadcast transmitter at the central station, a radio receiver at each substation, and radio control means at each substation controlled from the central station over the line connection for rendering the radio receiver inoperative.

2. A broadcast distributing system comprising a plurality of substations, a central station, a wire line connecting each substation with the central station, a radio broadcast transmitter at the central station, a radio receiver at each substation, and radio control means at each substation controlled from the central station over the line connection for rendering the radio receiver inoperative, together with telephone apparatus at the substations operatively connected with the line independently of said radio control means.

3. A broadcast distributing system comprising a plurality of substations, a central station, a wire line connecting each substation with the central station, means at the central station for transmitting radio broadcast, radio receiving means at the substations tuned to receive said radio broadcast, and means at the central office for testing said receiving means over the line connecting the substation with the central station.

4. A combined telephone exchange and radio broadcast distributing system comprising a plurality of substations, a central station, a wire line connecting each substation with the central station and a telephone on the line at each substation, means at the central station to interconnect the substations for telephonic conversation through said wire lines, means at the central station for transmitting radio broadcast, radio receiving means and a storage battery therefor at each substation, and means at the central station for testing the reception, and charging and testing the battery of each substation over the wire line without interference with telephone connections.

5. A combined telephone exchange and radio broadcast distributing system comprising a plurality of substations, a central station, a wire line connecting each substation with the central station and a telephone on the line at each substation, means at the central station to interconnect the substations for telephonic conversation through said wire lines, means at the central station for transmitting radio broadcast, radio receiving means at each substation with switching means arranged upon operation to render the receiving means operative and connect the output circuit thereof to the wire line, and means at the central station for controlling the operation of said switching means over the wire line.

6. A combined telephone exchange and radio broadcast distributing system comprising a plurality of substations, a central station, a wire line connecting each substation with the central station and a telephone on the line at each substation, means at the central station to interconnect the substations for telephonic conversation through said wire lines, means at the central station for transmitting radio broadcast, radio receiving means at each substation with switching means arranged upon operation to render the receiving means operative and connect the output circuit thereof to the wire line, and means at the central station for controlling the operation of said switching means over the wire line, together with means at the central station for transmitting different modulated waves.

7. A broadcasting system comprising a primary station, a plurality of receiving stations subdivided into districts, one or more secondary distributing stations in each district, means at said secondary stations to receive broadcast waves from the primary station at its own wave length and to relay and redistribute the same each in its own district on a standard wave length to which the receiving stations of its district are tuned and which is different for different districts, whereby a receiving station may receive simultaneously from two or more secondary stations in its district but will not receive simultaneously from secondary stations in different districts.

8. A combined telephone exchange and radio broadcast distributing system comprising a plurality of substations, a central station, a wire line connecting each substation with the central station and a telephone on the line at each substation, means at the central station to interconnect the substations for telephonic conversation through said wire lines, means at the central station for transmitting radio broadcast, radio receiving means at each substation with a storage battery therefor arranged to be charged over the wire line to ground at the substation, and means operable upon operation of the radio receiving means to disconnect the battery from ground.

9. A combined telephone exchange and radio broadcast distributing system comprising a plurality of substations, a central station, a wire line connecting each substation with the central station and a telephone on the line at each substation, means at the central station to interconnect the substations for telephonic conversation through said wire lines, means at the central station for transmitting radio broadcast, radio receiving means at each substation, a telephone battery at the central station for supplying current to the substations for telephone use and a radio battery at the central station for supplying current to the radio receiving means at the substation, said batteries being of such voltage and so connected with the lines at the central office as to be balanced against each other.

In testimony whereof I hereunto affix my signature.

EDWARD E. CLEMENT.